Patented July 1, 1930

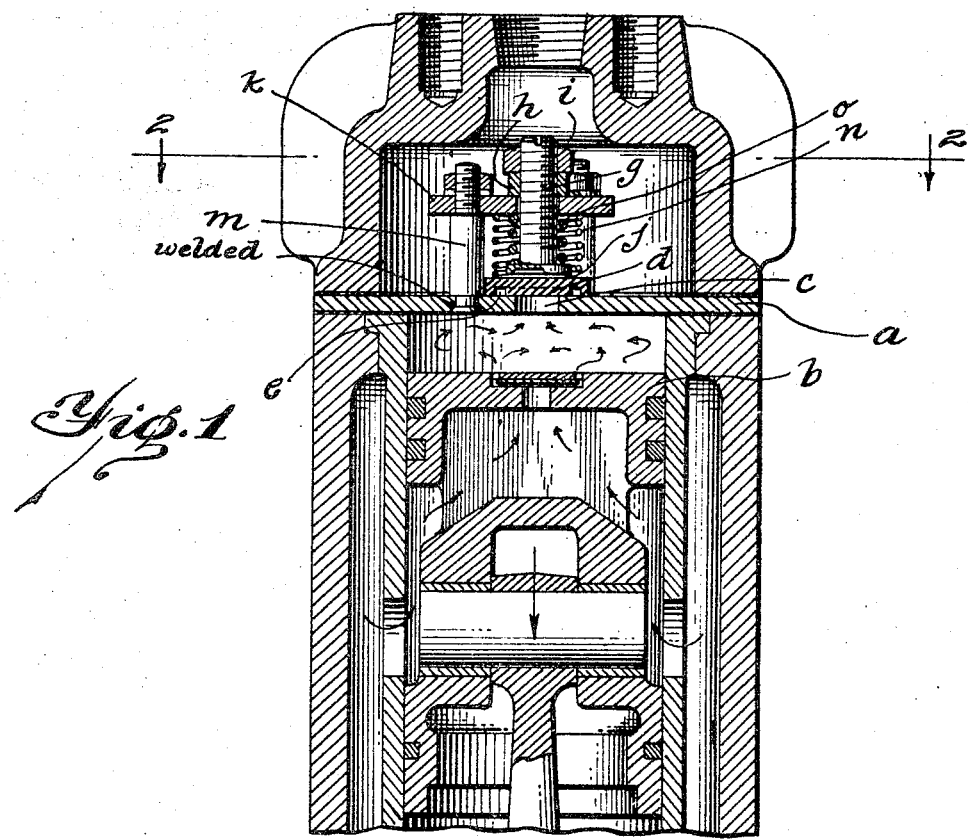
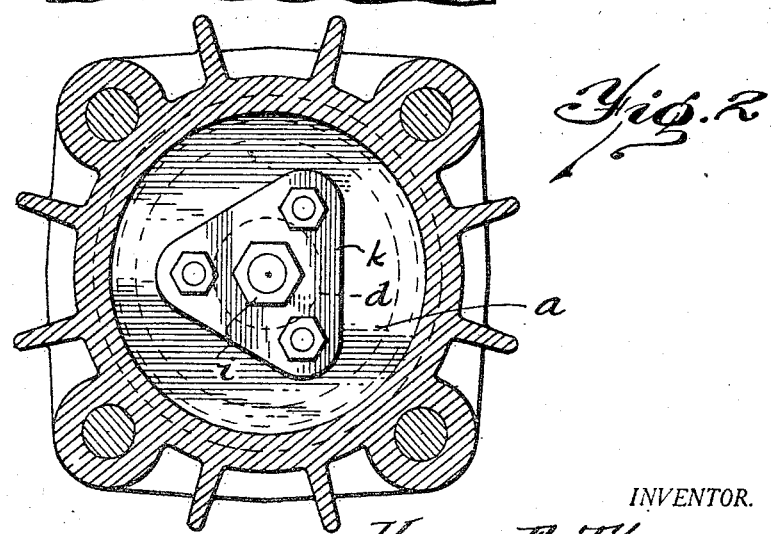
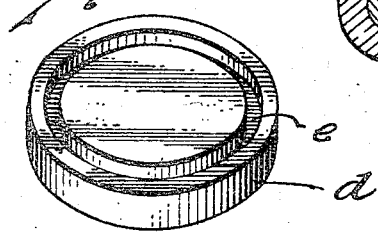

1,768,807

UNITED STATES PATENT OFFICE

HARRY E. THOMPSON, OF DETROIT, MICHIGAN, ASSIGNOR TO UNIVERSAL COOLER CORPORATION, OF DETROIT, MICHIGAN, A CORPORATION OF MICHIGAN

COMPRESSOR-VALVE STRUCTURE

Application filed February 15, 1926. Serial No. 88,243.

This invention relates to valves, especially valves for compressors used in domestic refrigeration. In domestic refrigeration it is very desirable to have the unit as quiet as possible. To this end I have designed a compressor which is provided with a special form of adjustable valve which approximates silent operation. This is accomplished by employment of two factors—one the material of which the valves is constructed (being non-metallic) and the other the design of the valve so as to form an air and a liquid cushion between the valve and its seat. I find that both these factors contribute to the silencing of the valves and that the one co-operates with the other in achieving the final result.

Another feature of my improved valve construction is that the same involves a unit cage which can be fastened as a unit to the cylinder head so as to be removable with this head which is ordinarily bolted between the cylinder cap and the cylinder block. This is not broadly new, but I do beleive that this, in connection with the double spring arrangement by which the heavy spring may be adjusted to fix the clearance in the normal valve operation, involves novelty. This will be more fully brought out in the detailed description following.

In the drawings:

Fig. 1 is a fragmentary vertical section of the compressor showing the improved valve and valve cage.

Fig. 2 is a section on the line 2—2 of Fig. 1.

Fig. 3 is a detail perspective of the valve.

The several parts of the compressor that are of well-known construction will not be detailedly referred to as they are apparent from the drawings. The charge is drawn through the piston head as clearly shown, and is then compressed between the cylinder head $a$ and the piston $b$. The outlet port $c$ is guarded by a valve $d$. This valve $d$ is preferably constructed of a non-metallic material, such for instance, as some of the composition materials that are now on the market for making timing gears. This is usually a tough fibrous material, and I preferably use a canvas bakelite disc.

Into this is cut a deep annular groove $e$. This exposes the rough fibrous character of the material and forms an efficient surface on which oil or liquid may accumulate and remain by capillary attraction. Inasmuch as this valve only lifts approximately a few thousandths of an inch, it will be apparent that by reason of such small amount of travel the gas and liquid accumulated in this groove is more or less trapped and these elements form a cushion which cushions the impact of the valve against its seat. Inasmuch as the valve is made of non-metallic and non-sonorous material it is practically noiseless for the two factors operate together to substantially eliminate any audible drumming of the valve upon its seat.

The valve stem is designated $g$ and is a separate stem and, as it will be seen, when the adjusting nut $h$ and the lock nut $i$ have been properly adjusted there is a slight clearance $j$, preferably about four-thousandths of an inch. By adjusting these two nuts the amount of this clearance is accurately fixed and can be varied to suit conditions. These nuts serve to hang the valve stem from the triangular plate $k$ which is bolted to the reduced threaded ends of the three posts $m$. These posts $m$ are riveted and then welded to the thin sheet metal cylinder head $a$, so as to hermetically seal them to such head. What is sometimes called a feather spring $n$ bears directly between the plate $k$ and the non-metallic valve, while a heavy coil spring $o$ bears between this plate and the enlarged head of the threaded valve stem. The purpose of this double spring construction is to permit the compressed gases to easily lift the valve the slight amount of clearance that is permitted it at each stroke of the piston. However, if the clearance space above the piston fills up with liquid, then the amount of opening of the valve might be incapable of permitting the discharge of the liquid as fast as it accumulates, the result would be something would have to break under the irresistible hydraulic pressure upon such an occasion. The heavy coil spring permits the valve to exceed its normal lift and discharge the liquid into the compression reservoir beyond.

The valve cage construction that I have described forms a unit that is entirely located on the removable head and in no way depends upon some of the springs, for instance, contacting with the cylinder cap. The whole is assembled as a unit on the head. When the cap is taken off, the head may be removed and a very nice adjustment made on the normal valve lift.

What I claim is:

1. In a compressor, the combination of a valve cage, comprising a plurality of posts, a support for the posts provided with a port, a free valve guarding said port within said posts, a plate carried on the end of said posts, a separate valve stem above said free valve, means for adjusting the valve stem at the end that passes through the plate, a light spring bearing between the plate and the free valve and a heavy spring bearing between the plate and the inner end of the valve stem.

2. A compressor valve, comprising a support, a cage supported thereon as a unit, said support provided with a port within said cage, a free floating disc valve within the cage guarding said port, a separate spring pressed valve stem and stop member for said valve movably supported above the valve and normally clearing the same a slight distance, means on the outside of the cage for varying the normal clearance between the end of the stem and the valve.

3. A compressor valve, comprising a support, a cage supported thereon as a unit, said support provided with a port within said cage, a free valve wholly within the cage guarding said port, a separate valve stem supported above the valve a slight distance, means on the outside of the cage for varying the clearance between the end of the stem and the valve, a heavy spring bearing between the cage and the inner end of the valve stem to permit the emergency lifting of the valve and a lighter spring bearing between the cage and the valve to permit the ordinary lifting.

4. A compressor valve comprising a support having a port, a caging on the support, a free floating valve wholly within the caging for guarding the port, an adjustable stop for the valve which limits the movement of the valve away from the port, and a spring acting upon this stop in such a way as to permit the valve to move farther away from the port when an undesirable amount of pressure exists.

5. A compressor valve, comprising a support having a port surrounded by a valve seat, a valve caging on the support around the port, a free floating valve for guarding the port which is guided in its movement by the caging, a stop member carried by the caging which limits the movement of the valve away from the port in normal operation, a spring acting on this stop member whereby said stop may be made to recede from the port when an abnormal amount of pressure exists, and means for adjusting the normal position of the stop to vary the limit of movement of the valve away from the port.

6. A compressor valve, comprising a support having a port surrounded by a valve seat, a caging carried entirely by the support and positioned around the port, a free floating valve for guarding the port, a stop member carried by the caging which limits the movement of the valve away from the port in normal operation, a spring acting on the stop member whereby said stop may recede from the port when an abnormal amount of pressure exists, said stop member being adjustably carried by the caging so that the limit of movement of the valve in normal operation can be varied.

In testimony whereof I affix my signature.

HARRY E. THOMPSON.